US009754098B2

(12) United States Patent
Li et al.

(10) Patent No.: US 9,754,098 B2
(45) Date of Patent: Sep. 5, 2017

(54) PROVIDING POLICY TIPS FOR DATA LOSS PREVENTION IN COLLABORATIVE ENVIRONMENTS

(71) Applicant: Microsoft Technology Licensing, LLC, Redmond, WA (US)

(72) Inventors: Yu Li, Bellevue, WA (US); Richard Wesley Holley, Redmond, WA (US); Srivalli Chavali, Redmond, WA (US); Jack Kabat, Sammamish, WA (US); Leif Brenne, Bellevue, WA (US); Serguei Martchenko, Redmond, WA (US); Mark Mullins, Redmond, WA (US); Mashuri Libman, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/633,097

(22) Filed: Feb. 26, 2015

(65) Prior Publication Data

US 2016/0117517 A1    Apr. 28, 2016

Related U.S. Application Data

(60) Provisional application No. 62/068,744, filed on Oct. 26, 2014, provisional application No. 62/068,726, filed on Oct. 26, 2014.

(51) Int. Cl.
*H04L 29/06* (2006.01)
*G06F 21/44* (2013.01)
(Continued)

(52) U.S. Cl.
CPC .......... *G06F 21/44* (2013.01); *G06F 17/211* (2013.01); *G06F 21/31* (2013.01); *G06F 21/6209* (2013.01); *G06Q 10/103* (2013.01)

(58) Field of Classification Search
CPC .......... G06F 21/6209; G06F 21/6218; G06F 21/6245; G06F 17/211; G06F 21/31; G06F 21/44; G06Q 10/103
(Continued)

(56) References Cited

U.S. PATENT DOCUMENTS 7,769,731 B2    8/2010  O'Brien
7,917,938 B2 *  3/2011  Jacobson ................ H04L 29/06
                                                        726/1

(Continued)

FOREIGN PATENT DOCUMENTS

GB     2466367 A       6/2010
WO     2009055083 A1   4/2009

OTHER PUBLICATIONS

"International Search Report & Written Opinion Issued in PCT Application No. PCT/US2015/057269", Mailed Date: Dec. 21, 2015, 10 Pages.

(Continued)

*Primary Examiner* — Sarah Su
(74) *Attorney, Agent, or Firm* — Turk IP Law, LLC

(57) ABSTRACT

A policy tip or end user notification is provided for data loss prevention in collaborative environments. A document interactivity application detects an action or trigger by an end user that affects a document. The document is processed, through a classification engine and a unified policy engine, with policies based on the action to detect a matched policy. A policy tip associated with the matched policy is identified and displayed on the display device in association with the document.

18 Claims, 9 Drawing Sheets

(51) Int. Cl.
*G06F 21/31* (2013.01)
*G06F 17/21* (2006.01)
*G06F 21/62* (2013.01)
*G06Q 10/10* (2012.01)

(58) Field of Classification Search
USPC .................................................... 726/27, 26
See application file for complete search history.

(56) References Cited

U.S. PATENT DOCUMENTS

| | | |
|---|---|---|
| 7,996,385 B2 | 8/2011 | Rowney et al. |
| 8,060,596 B1 | 11/2011 | Wootton et al. |
| 8,111,154 B1* | 2/2012 | Puri .................. G08B 21/0202 340/539.13 |
| 8,141,159 B2* | 3/2012 | Peled .................... G06F 21/316 726/1 |
| 8,225,371 B2 | 7/2012 | Jones et al. |
| 8,316,049 B2* | 11/2012 | Saito ...................... G06F 21/10 707/781 |
| 8,499,152 B1 | 7/2013 | Chen et al. |
| 8,533,841 B2* | 9/2013 | Kulkarni ............... G06F 21/552 726/25 |
| 8,543,606 B2 | 9/2013 | Pulfer et al. |
| 8,656,455 B1 | 2/2014 | Bailey et al. |
| 8,671,080 B1 | 3/2014 | Upadhyay et al. |
| 8,800,031 B2 | 8/2014 | Cecil et al. |
| 9,195,808 B1* | 11/2015 | Nestler ................... G06F 21/10 |
| 2006/0075228 A1 | 4/2006 | Black et al. |
| 2006/0120526 A1* | 6/2006 | Boucher ............ G06F 21/6218 380/247 |
| 2006/0200803 A1* | 9/2006 | Neumann ................ G06F 8/71 717/120 |
| 2006/0265760 A1* | 11/2006 | Daemke ............... G06F 21/604 726/27 |
| 2008/0120688 A1* | 5/2008 | Qiu ....................... G06F 21/552 726/1 |
| 2008/0209336 A1* | 8/2008 | Brown .............. G06F 17/30873 715/744 |
| 2009/0070881 A1* | 3/2009 | Yellepeddy ......... G06F 21/6245 726/26 |
| 2009/0164878 A1* | 6/2009 | Cottrille .............. G06F 21/6245 715/210 |
| 2010/0071024 A1* | 3/2010 | Eyada ................. H04L 63/0263 726/1 |
| 2010/0082687 A1* | 4/2010 | Saito ...................... G06F 21/10 707/786 |
| 2010/0306850 A1 | 12/2010 | Barilem et al. |
| 2011/0167474 A1 | 7/2011 | Sinham et al. |
| 2012/0017261 A1* | 1/2012 | Lim ........................ G06F 21/62 726/1 |
| 2012/0159565 A1 | 6/2012 | Bray et al. |
| 2012/0304316 A1 | 11/2012 | Ramani et al. |
| 2013/0104190 A1* | 4/2013 | Simske ................... G06F 21/60 726/1 |
| 2013/0110748 A1 | 5/2013 | Talati et al. |
| 2013/0198618 A1* | 8/2013 | Tanzer .................. G06F 21/604 715/255 |
| 2013/0305322 A1* | 11/2013 | Raleigh ................ G06Q 30/016 726/4 |
| 2013/0340030 A1* | 12/2013 | Riley ..................... H04L 63/20 726/1 |
| 2014/0006347 A1 | 1/2014 | Qureshi et al. |
| 2014/0007181 A1 | 1/2014 | Sarin et al. |
| 2014/0020044 A1 | 1/2014 | Ayres et al. |
| 2014/0020045 A1* | 1/2014 | Kabat .................... G06F 21/60 726/1 |
| 2014/0026181 A1 | 1/2014 | Kiang et al. |
| 2014/0123228 A1* | 5/2014 | Brill ..................... H04L 63/1416 726/4 |
| 2014/0194094 A1 | 7/2014 | Ahuja et al. |
| 2014/0196105 A1* | 7/2014 | Hung .................. H04L 63/1416 726/1 |
| 2014/0323213 A1* | 10/2014 | Wakeford .............. A63F 13/60 463/31 |
| 2015/0082379 A1* | 3/2015 | Hou .................. G06F 17/30899 726/1 |
| 2015/0222665 A1* | 8/2015 | Eberlein ................ H04L 63/10 726/1 |
| 2016/0055343 A1* | 2/2016 | Coard .................... G06F 21/31 726/7 |
| 2016/0072831 A1* | 3/2016 | Rieke .................. H04L 63/1425 726/1 |
| 2016/0088020 A1* | 3/2016 | Chan ..................... H04L 63/20 726/1 |
| 2016/0359860 A1* | 12/2016 | Dasari .................... H04L 63/102 |
| 2017/0126697 A1* | 5/2017 | Li ........................ H04L 63/105 |

OTHER PUBLICATIONS

"Second Written Opinion Issued in PCT Application No. PCT/US2015/57269", Mailed Date: Oct. 11, 2016, 6 Pages.

"International Preliminary Report on Patentability Issued in PCT Application No. PCT/US2015/057269", Mailed Date: Apr. 12, 2017, 7 Pages.

* cited by examiner

PROVIDING POLICY TIPS FOR DATA LOSS PREVENTION IN COLLABORATIVE ENVIRONMENTS

CROSS-REFERENCE TO RELATED APPLICATIONS

This Application claims benefit under 35 U.S.C. §119 (e) of U.S. Provisional Application Ser. No. 62/068,744 filed on Oct. 26, 2014, and U.S. Provisional Application Ser. No. 62/068,728 filed on Oct. 26, 2014. The Provisional Applications are herein incorporated by reference in their entireties.

BACKGROUND

People interact with computer applications through user interfaces. While audio, tactile, and similar forms of user interfaces are available, visual user interfaces through a display device are the most common form of a user interface. With the development of faster and smaller electronics for computing devices, smaller size devices such as hand-held computers, smart phones, tablet devices, and comparable devices have become common. Such devices execute a wide variety of applications ranging from document interactivity applications to complicated analysis tools. Many such applications display documents through a display and enable users to provide input associated with the applications' operations.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing a policy tip for data loss prevention in collaborative environments. In some example embodiments, a document interactivity application may display a document to an end user on a display device of a computing device that executes the document interactivity application. The document interactivity application may present the document through a user interface displayed on the display device. An action, from the end user, that affects the document may be detected on the display device. The action may include a save action, and a share action, among others. The action may also include a trigger, such as the document being open or in edit mode for some period of time, among others. The document may be processed based on the action with policies to detect a matched policy. A policy tip may be identified associated with the matched policy. The policy tip may be displayed through the user interface on the display device in association with the document. The policy tip may provide a notification to the end user to inform the end user of the matched policy, along with inputs to provide end user reported feedback.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
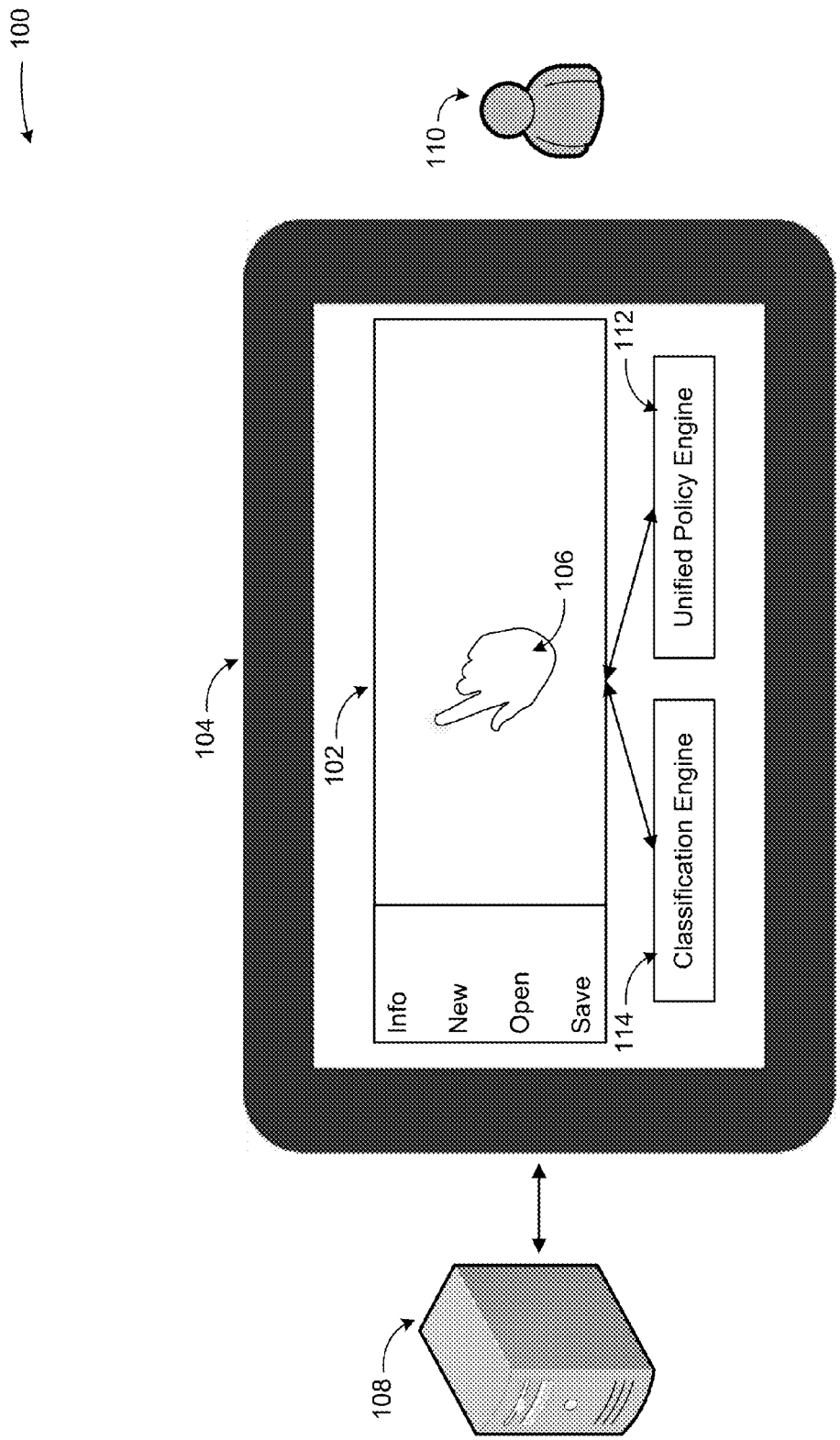
FIG. 1 is an architectural diagram illustrating example components of a computing device configured to provide a policy tip for data loss prevention in collaborative environments, according to embodiments.

As briefly described above, a policy tip may be provided for data loss prevention in collaborative environments by a document interactivity application. An action by an end user that affects a document may be detected. The document may be displayed on a display device of a computing device that executes the document interactivity application. The action may include a save action, and a share action, among others. The action may also include a trigger, such as a document being open or in edit mode for some period of time, among others. The document may be processed based on the action with policies to detect a matched policy. A policy tip associated with the matched policy may be identified and displayed on the display device in association with the document.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable memory device includes a hardware device that includes a hard disk drive, a solid state drive, a compact disk, and a memory chip, among others. The computer-readable storage medium can for example be implemented via one or more of a volatile computer memory, a non-volatile memory, a hard drive, and a flash drive.

Throughout this specification, the term "platform" may be a combination of software and hardware components to provide a policy tip for data loss prevention in collaborative environments. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example embodiments may be found in the following description.

FIG. 1 is an architectural diagram illustrating example components of a computing device configured to provide a policy tip for data loss prevention in collaborative environments, according to embodiments.

In a diagram 100, a computing device 104 may execute a document interactivity application 102. The document interactivity application 102 may include an application configured to provide controls and associated operations to manage, edit, and present a document to an end user 110. The computing device 104 may include a tablet device, a laptop computer, a desktop computer, and a smart phone, among others. The end user 110 may be allowed to interact with the document interactivity application 102 through an input device or touch enabled display component of the computing device 104. The computing device 104 may include a display device such as the touch enabled display component, and a monitor, among others to provide a user interface of the document interactivity application 102 to the end user 110.

The document interactivity application 102 may process a document with policies based on an action 106 on the document. The document may be retrieved from an external source such as a server 108. The action 106 may include a save action, and a share action, or a trigger, such as a document being open or in edit mode for some period of time, among others. The end user 110 may interact with the document interactivity application 102 with a keyboard based input, a mouse based input, a voice based input, a pen based input, and a gesture based input, among others. The gesture based input may include one or more touch based actions such as a touch action, a swipe action, a press and hold, a swipe and hold, or a combination of each, among others.

The document interactivity application 102 may retrieve the document or the policies from a local source such as a storage media, a memory, a hard disk drive, and a solid state drive, among others. The document or policies may also be received from a remote source such as the server 108 that provides content and data dissemination services.

The document interactivity application 102 may include components such as a classification engine 114 and a unified policy engine 112. The classification engine 114 may analyze a text of the document to identify a type of information stored in the text. An example may include identification of a private information such as a credit card number, a social security number, and a health form, among others. The unified policy engine 112 may process the information identified in the text of the document (by the classification engine 114) with policies to identify a matched policy in relation to dissemination of the identified information based on the action 106. A policy tip associated with the matched policy may be presented to the end user 110 to inform the end user 110 of the matched policy.

Alternatively, the document interactivity application 102 may be a simple client application used to display the document. In such a scenario, a server application in the server 108 may execute components that includes the classification engine 114 and the unified policy engine 112 to process the document with policies. The server application may transmit the policy tip associated with a matched policy to the document interactivity application 102 to inform the end user 110 of the matched policy.

While the example system in FIG. 1 has been described with specific components including the computing device 104, the document interactivity application 102, embodiments are not limited to these components or system configurations and can be implemented with other system configuration employing fewer or additional components.

Figure 2:
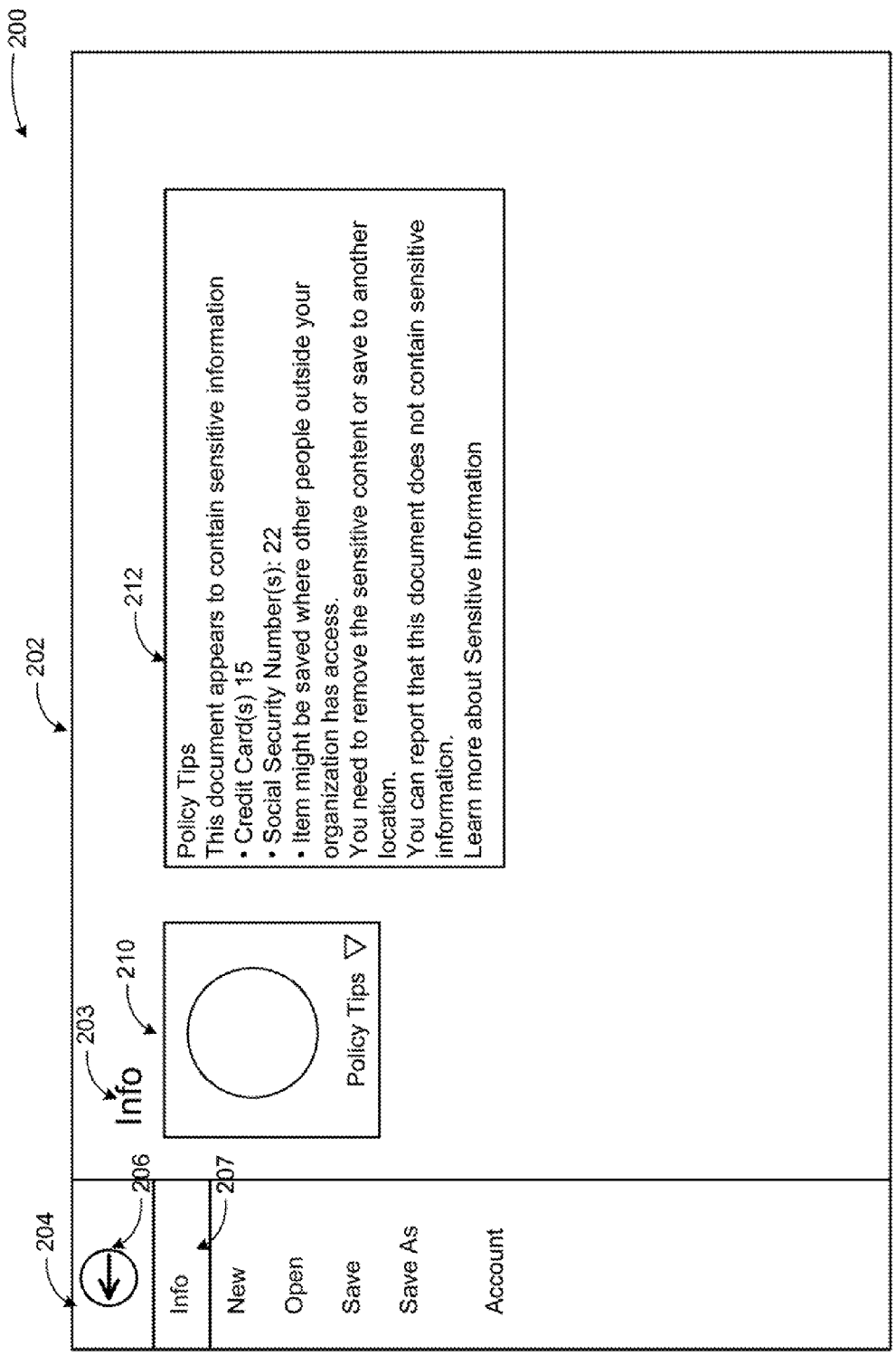
FIG. 2 illustrates an example of displaying a policy tip for data loss prevention in collaborative environments, according to embodiments.

FIG. 2 illustrates an example of displaying a policy tip for data loss prevention in collaborative environments, according to embodiments.

In a diagram 200, a document interactivity application 202 may display a policy tip 212 to inform an end user of a matched policy. The document interactivity application 202 may display a user interface that provides a navigation menu 204. The navigation menu may include controls to manage a document. The controls may include operations that include a save operation, a create operation, and an edit operation, among others. A navigation control 206 may also allow an end user to scroll through other user interfaces of the document interactivity application 202 such as a document presentation user interface.

A user action may select an information control 207 on the navigation menu 204. Operations may be executed to display an information user interface 203 by the document interactivity application 202 in response to activation of the information control 207. The information user interface 203 may display a policy tip control 210. The policy tip control 210 may include operations to analyze the document with policies that correspond to the document. The policies may include organizational policies, among others, that include rules to govern management of the document. An example may include save operation and share operation, among other operation restrictions based on an access privilege of the end user, among other restrictions.

In response to an activation of the policy tip control 210, the document interactivity application 202 may execute operations to analyze the document with policies through components of the document interactivity application 202. The components include a classification engine and a unified policy engine. The classification engine may process a text of the document to identify a type associated with parts of the text. In an example scenario, the classification engine may identify credit card numbers and social security numbers in the text of the document.

The parts of the text with identified types may be processed with policies through the unified policy engine. Rules of the policies may be applied to the parts of the text to identify a matched policy. The end user may be notified of the matched policy through the policy tip 212. The policy tip 212 may inform the end user of the matched policy. An example may include notifying the end user of the identified private information within the text of the document such as the credit card numbers and the social security numbers.

Figure 3:
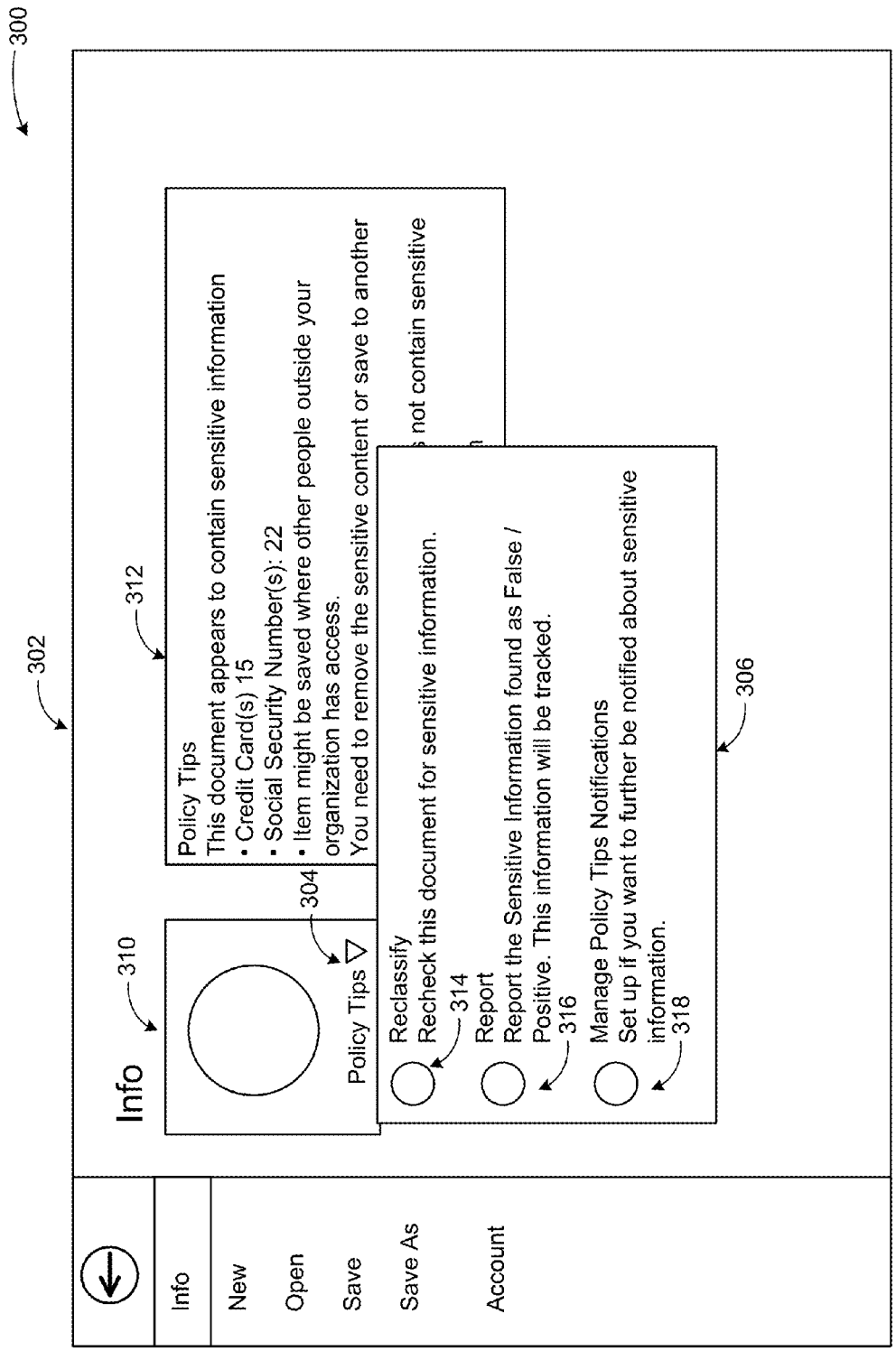
FIG. 3 illustrates an example of managing a policy associated with a document and a displayed policy tip, according to embodiments.

FIG. 3 illustrates an example of managing a policy associated with a document and a displayed policy tip, according to embodiments.

In a diagram 300, a document interactivity application 302 may display a policy tip 312 in response to activation of a policy tip control 310. The document interactivity application 302 may execute operations to analyze the text of the document with policies that may be retrieved from a local resource or from an authorized external resource. The text may be analyzed with the policies to identify parts of the text that may match one or more policies. The end user may be notified of a matched policy through the policy tip 312.

The policy tip control 310 may include a policy management pane control 304. The policy management pane control 304 may include operations to display a management pane 306 that includes policy management controls. The policy management controls may include a reclassify control 314, a false positive control 316, a manage policy control 318, and a report override control, among others. The reclassify control 314 may re-analyze the document with policies to detect a matched policy. An example scenario may include detecting changes to the document, and receiving updates to the policies, among other actions. The changes and updates may necessitate reanalysis of the document with the policies to re-detect the matched policy. The policy tip 312 may be modified to inform the end user of the matched policy detected in the reanalysis of the document.

The false positive control 316 may include operations to report the matched policy as a false positive. A false positive identification such as the matched policy and information associated with the matched parts of the text may be transmitted to an administrator of the matched policy. The transmitted false positive identification may inform the administrator to manage the matched policy to prevent a future false positive identification.

The manage policy control 318 may include operations to manage a notification configuration associated with the policy tip 312. The end user may be allowed to stop display of a future policy tip related to the policy tip 312 based on a privilege level of the end user. Alternatively, the end user may be allowed to stop display of any future policy tips based on a privilege level of the end user.

Figure 4:
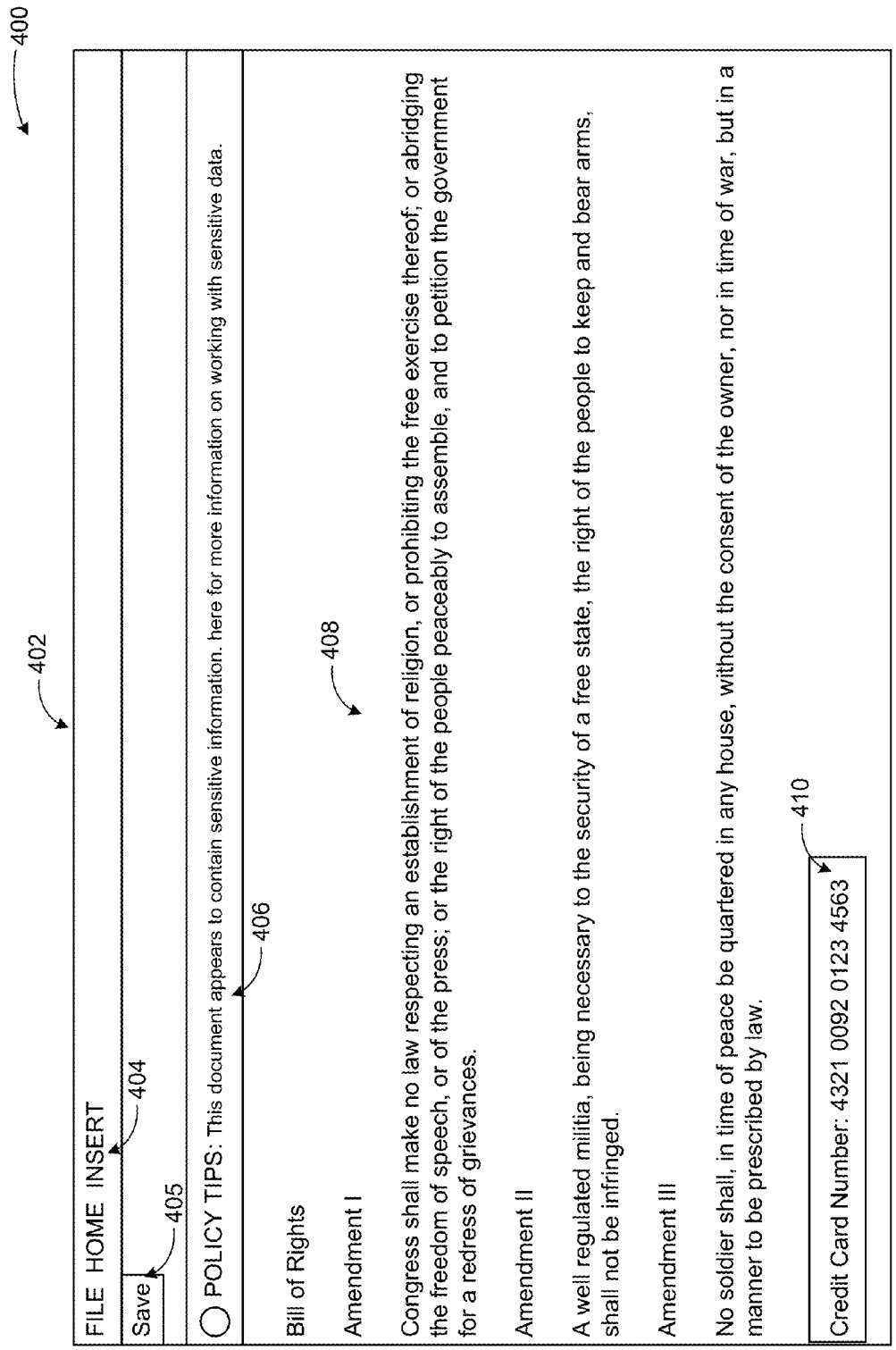
FIG. 4 illustrates an example of displaying a policy tip for data loss prevention in collaborative environments in response to a save action, according to embodiments.

FIG. 4 illustrates an example of displaying a policy tip for data loss prevention in collaborative environments in response to a save action, according to embodiments.

In a diagram 400, a document interactivity application 402 may display a document 408 in a user interface that includes controls 404 to manage the document 408. The controls 404 may include menus of controls that include operations to manage the document 408. In an example scenario, a save action 405 may be detected on a save control to save the document 408. In response to detecting the save action 405, the document interactivity application 402 may analyze the document 408 based on the save action 405 with the policies. A subset of the policies associated with the save action 405 may be selected for the analysis. The subset of the policies may be identified based on rules that are related to the save action 405.

The text of the document 408 may be processed through a classification engine of the document interactivity application 402 to identify a type for parts of the text of the document 408. In an example scenario, a part of the text of the document 408 may be identified as a private information 410 such as a credit card number. Alternatively, a metadata of the document 408 may also be processed through the classification engine to identify a type for parts of the metadata. A unified policy engine of the document interactivity application 402 may process the private information 410 or other parts of the text (or parts of the metadata) that have identified types, with policies. In response to detecting a matched policy, a policy tip 406 may be displayed that informs the end user of the matched policy. Along with displaying the policy tip 406, the private information 410 may also be highlighted through a highlighting scheme such as a highlighting a background color of a region surrounding the private information 410, or changing a font of the private information 410 to a bold font, among others. In addition, along with displaying the policy tip, the private information 410 may also be displayed and searchable in a separate navigation dialog or window in the document interactivity application 402.

Figure 5:
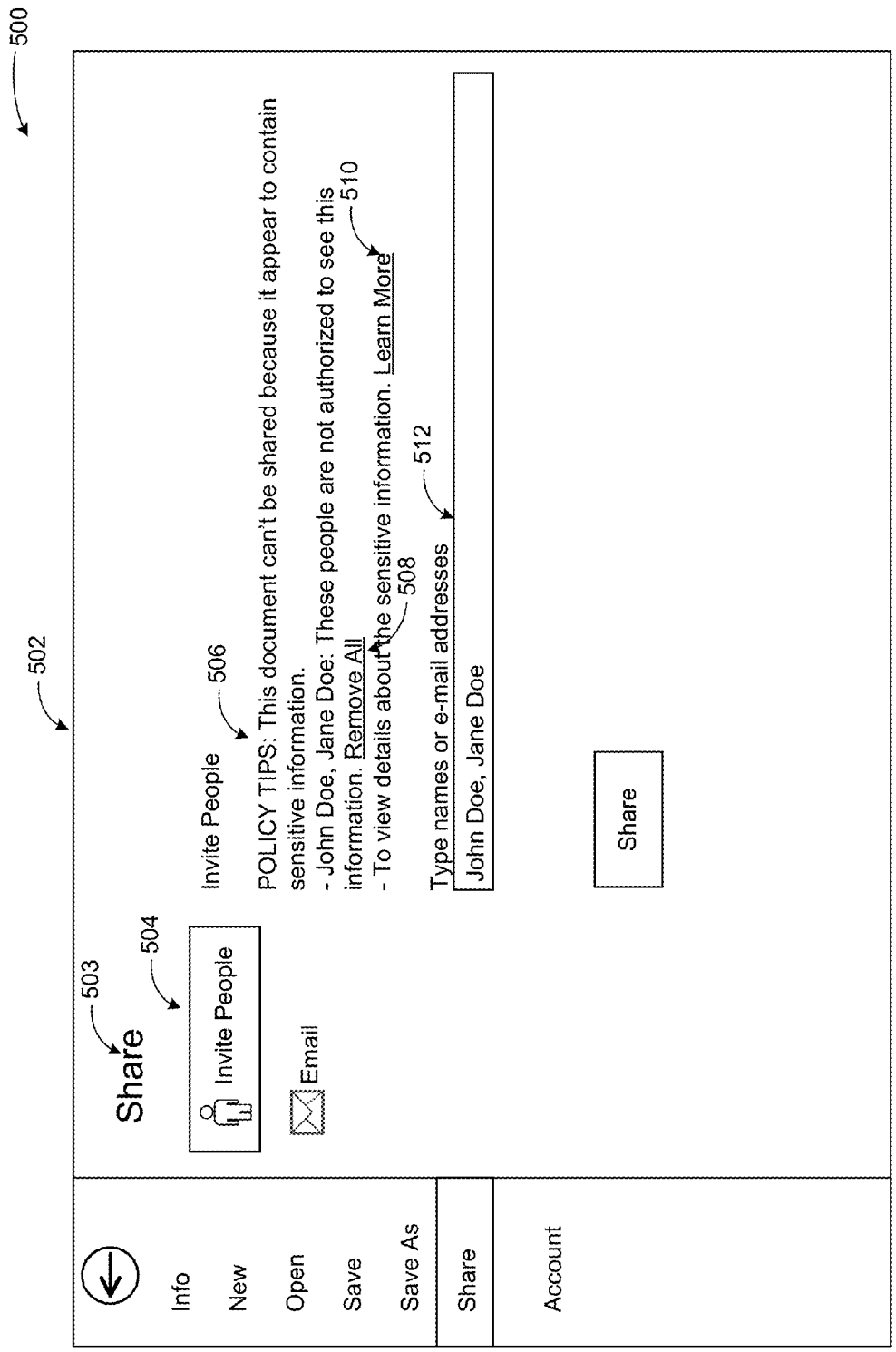
FIG. 5 illustrates an example of displaying a policy tip for data loss prevention in collaborative environments in response to a share action, according to embodiments.

FIG. 5 illustrates an example of displaying a policy tip for data loss prevention in collaborative environments in response to a share action, according to embodiments.

In a diagram 500, a document interactivity application 502 may display a share user interface 503 to allow an end user to share the document with other end users. A share action 504 may activate operations to display control components on the share user interface 503 to share the document with other end users. The control components may include a textbox 512 to enter identifiers for the other end users to share the document.

The end user may enter identifiers for the other end users to share the document, into the textbox 512. In response to detecting the identifiers, the document interactivity application 502 may analyze the identifiers with a subset of policies associated with the share action 504. Access privilege of the other end users may be analyzed with the rules of the subset of the policies associated with the share action 504. A matched policy may be identified in response to detecting the other end users having an insufficient access privilege to the document. A policy tip 506 may be displayed to notify the end user of the matched policy. The policy tip 506 may identify the identifiers of the other end users that trigger the matched policy.

The policy tip 506 may also include additional controls to allow the end user to further investigate the matched policy or to comply with the matched policy. A remove control 508 may include operations to remove the identifiers from the textbox 512 that trigger the matched policy. An investigate control 510 may display detailed information about the matched policy or allow searching of the identifiers within the document.

Figure 6:
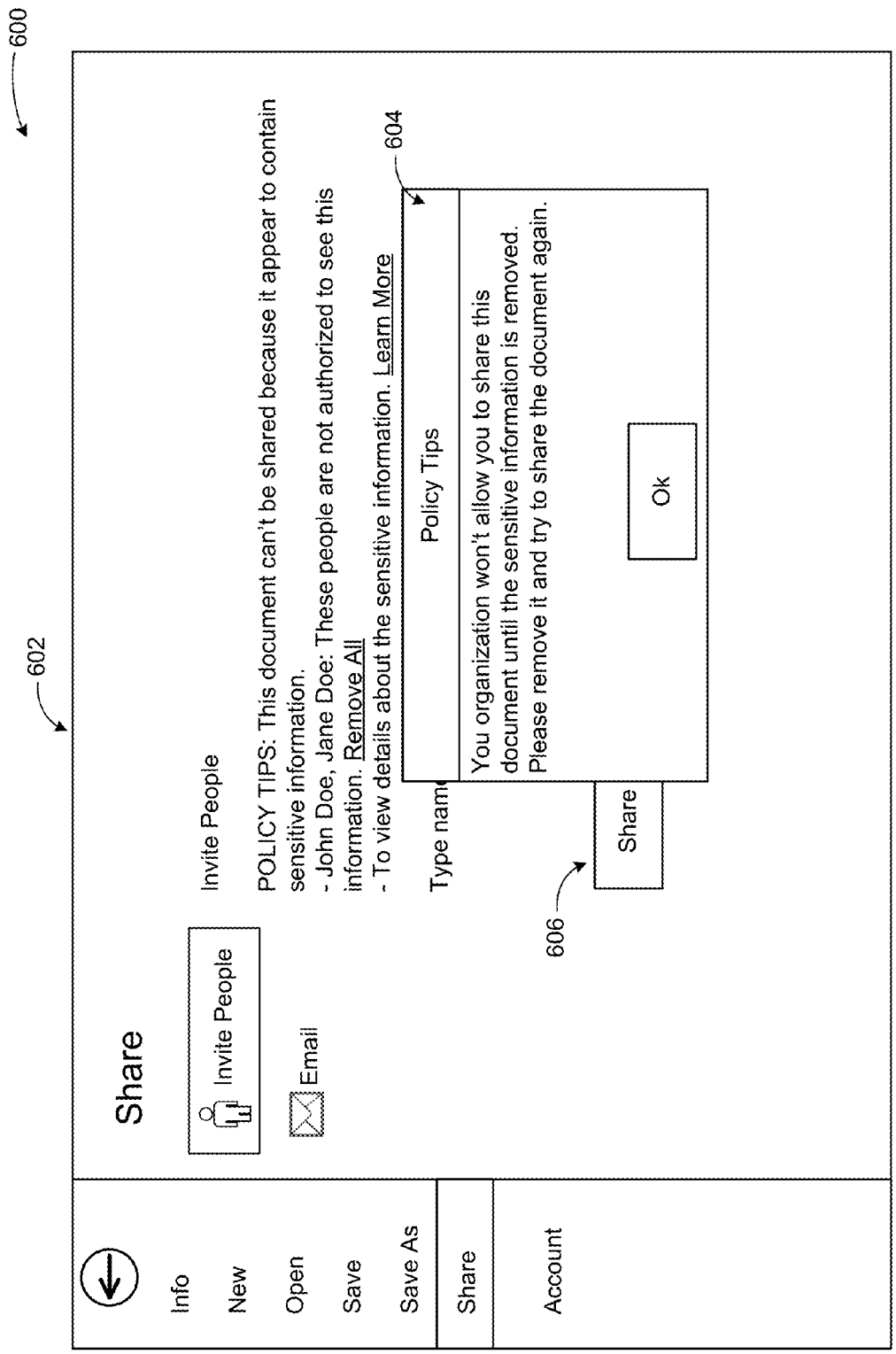
FIG. 6 illustrates an example of blocking an action in response to an override action to override a matched policy, according to embodiments.

FIG. 6 illustrates an example of blocking an action in response to an override action to override a matched policy, according to embodiments.

In a diagram 600, a document interactivity application 602 may display a policy tip 604 in response to an override action 606 to override a matched policy while attempting to share a document with other end users. The document interactivity application 602 may detect an override privilege of an end user attempting to override the matched policy through the override action 606. In response to detecting the override privilege of the end user as insufficient to override the matched policy, the override action 606 may be blocked and the policy tip 604 may be displayed to inform the end user of the matched policy, or insufficient override privilege of the end users, among others.

Alternatively, the document interactivity application 602 may detect the override privilege of the end user as sufficient to override the matched policy, execute the override action on the document, and transmit the override action to an administrator of the matched policy to inform the administrator to manage the matched policy. In one scenario, the document interactivity application 602 may execute operations associated with the override action 606 and share the document with other end users as identified by the end user. In another scenario, the document interactivity application 602 may detect the override privilege of the end user as sufficient with a business justification. In such a scenario, a prompt may be displayed to capture the justification from the end user prior to overriding the matched policy and executing the override action 606 to share the document with other end users. The justification may be saved for future analysis or reporting by an entity such as the administrator of the policies.

The technical advantage of providing a policy tip for data loss prevention in collaborative environments may include improvements in usability of managing interactions of an end user with a document. The interactions may be managed based on policies associated with the document that govern an action by an end user that affects the document. Policy based data retention differs from legacy solutions that are based on access blocking schemes.

The example scenarios and schemas in FIGS. 1 through 6 are shown with specific components, data types, and configurations. Embodiments are not limited to systems according to these example configurations. Providing a policy tip for data loss prevention in collaborative environments may be implemented in configurations employing fewer or additional components in applications and user interfaces. Furthermore, the example schema and components shown in FIGS. 1 through 6 and their subcomponents may be implemented in a similar manner with other values using the principles described herein.

Figure 7:
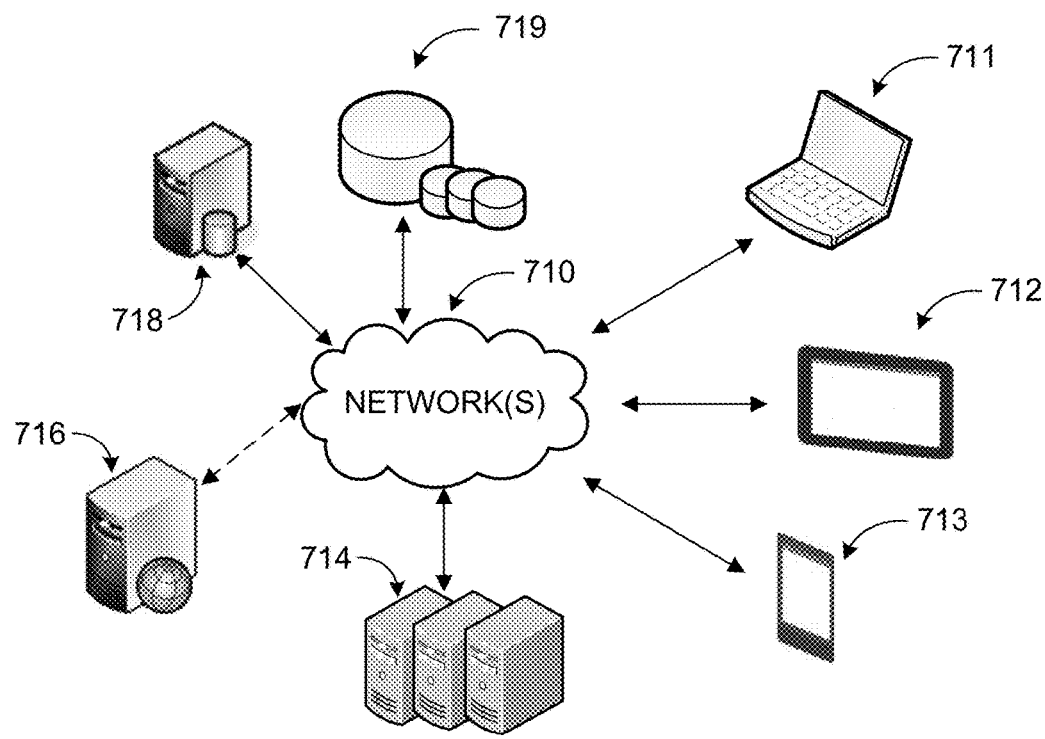
FIG. 7 is a simplified networked environment, where a system according to embodiments may be implemented.

FIG. 7 is an example networked environment, where embodiments may be implemented. A document interactivity application configured to provide a policy tip for data loss prevention in collaborative environments may be implemented via software executed over one or more servers 714 such as a hosted service. The platform may communicate with client applications on individual computing devices such as a smart phone 713, a mobile computer 712, or desktop computer 711 ('client devices') through network(s) 710.

Client applications executed on any of the client devices 711-713 may facilitate communications via application(s) executed by servers 714, or on individual server 716. A document interactivity application may detect an action by an end user that affects a document. The document may be processed based on the action with policies to detect a matched policy. A policy tip associated with the matched policy may be identified and displayed on the display device in association with the document. The document interactivity application may store data associated with the policies in data store(s) 719 directly or through database server 718.

Network(s) 710 may comprise any topology of servers, clients, Internet service providers, and communication media. A system according to embodiments may have a static or dynamic topology. Network(s) 710 may include secure networks such as an enterprise network, an unsecure network such as a wireless open network, or the Internet. Network(s) 710 may also coordinate communication over other networks such as Public Switched Telephone Network (PSTN) or cellular networks. Furthermore, network(s) 710 may include short range wireless networks such as Bluetooth or similar ones. Network(s) 710 provide communication between the nodes described herein. By way of example, and not limitation, network(s) 710 may include wireless media such as acoustic, RF, infrared and other wireless media.

Figure 9:
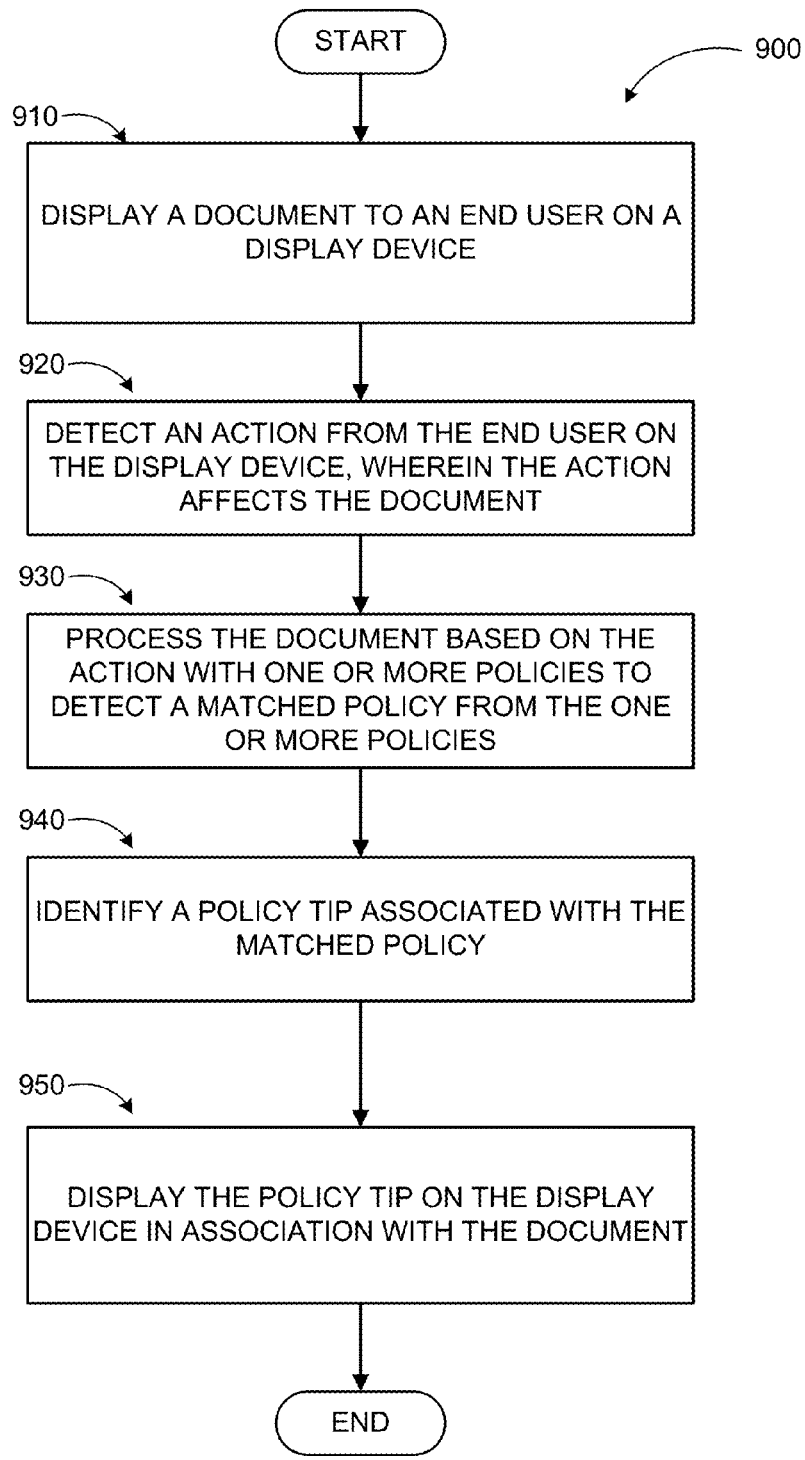
FIG. 9 illustrates a logic flow diagram for a process to provide a policy tip for data loss prevention in collaborative environments, according to embodiments.

Many other configurations of computing devices, applications, data sources, and data distribution systems may be employed to provide a policy tip for data loss prevention in collaborative environments. Furthermore, the networked environments discussed in FIG. 9 are for illustration purposes only. Embodiments are not limited to the example applications, modules, or processes.

Figure 8:
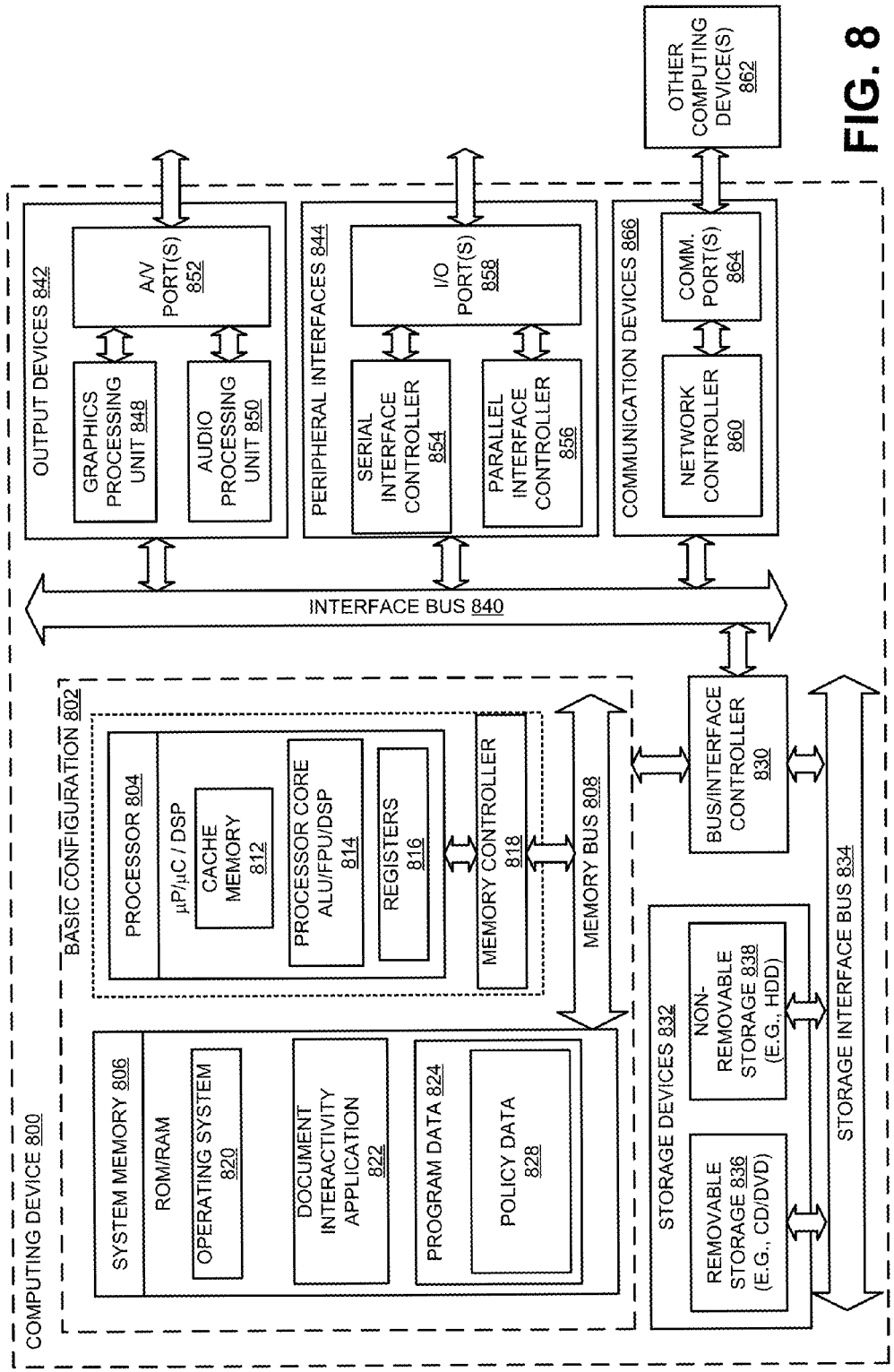
FIG. 8 illustrates a general purpose computing device, which may be configured to provide a policy tip for data loss prevention in collaborative environments, according to embodiments.

FIG. 8 illustrates a general purpose computing device, which may be configured to provide a policy tip for data loss prevention in collaborative environments, arranged in accordance with at least some embodiments described herein.

For example, the computing device 800 may be used to provide a policy tip for data loss prevention in collaborative environments. In an example of a basic configuration 802, the computing device 800 may include one or more processors 804 and a system memory 806. A memory bus 808 may be used for communication between the processor 804 and the system memory 806. The basic configuration 802 may be illustrated in FIG. 8 by those components within the inner dashed line.

Depending on the desired configuration, the processor 804 may be of any type, including, but not limited to, a microprocessor (µP), a microcontroller (µC), a digital signal processor (DSP), or any combination thereof. The processor 804 may include one more levels of caching, such as a level cache memory 812, a processor core 814, and registers 816. The processor core 814 may include an arithmetic logic unit (ALU), a floating point unit (FPU), a digital signal processing core (DSP Core), or any combination thereof. A memory controller 818 may also be used with the processor 804, or in some implementations, the memory controller 818 may be an internal part of the processor 804.

Depending on the desired configuration, the system memory 806 may be of any type including but not limited to volatile memory (such as RAM), non-volatile memory (such as ROM, flash memory, etc.), or any combination thereof. The system memory 806 may include an operating system 820, a document interactivity application 822, and a program data 824. The document interactivity application 822 may detect an action by an end user that affects a document. The document may be processed based on the action with policies to detect a matched policy. A policy tip associated with the matched policy may be identified and displayed on the display device in association with the document. Components of the document interactivity application 822 (such as a user interface) may also be displayed on a display device associated with the computing device 800. An example of the display device may include a hardware screen that may be communicatively coupled to the computing device 800. The display device may include a touch based device that detects gestures such as a touch action. The display device may also provide feedback in response to detected gestures (or any other form of input) by transforming a user interface of the document interactivity application 822, displayed by the touch based device. The program data 824 may also include, among other data, a policy data 828, or the like, as described herein. The policy data 828 may include policies, and policy tips, among others.

The computing device 800 may have additional features or functionality, and additional interfaces to facilitate communications between the basic configuration 802 and any desired devices and interfaces. For example, a bus/interface controller 830 may be used to facilitate communications between the basic configuration 802 and one or more data storage devices 832 via a storage interface bus 834. The data storage devices 832 may be one or more removable storage devices 836, one or more non-removable storage devices 838, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable, and non-removable media implemented in any method or technology for storage of information, such as computer-readable instructions, data structures, program modules, or other data.

The system memory 806, the removable storage devices 836, and the non-removable storage devices 838 may be examples of computer storage media. Computer storage media may include, but may not be limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 800. Any such computer storage media may be part of the computing device 800.

The computing device 800 may also include an interface bus 840 for facilitating communication from various interface devices (for example, one or more output devices 842, one or more peripheral interfaces 844, and one or more communication devices 866) to the basic configuration 802 via the bus/interface controller 830. Some of the example output devices 842 may include a graphics processing unit 848 and an audio processing unit 850, which may be configured to communicate to various external devices, such as a display or speakers via one or more A/V ports 852. One or more example peripheral interfaces 844 may include a serial interface controller 854 or a parallel interface controller 856, which may be configured to communicate with external devices, such as input devices (for example, keyboard, mouse, pen, voice input device, touch input device, etc.) or other peripheral devices (for example, printer, scanner, etc.) via one or more I/O ports 858. An example communication device 866 may include a network controller 860, which may be arranged to facilitate communications with one or more other computing devices 862 over a network communication link via one or more communication ports 864. The one or more other computing devices 862 may include servers, client equipment, and comparable devices.

The network communication link may be one example of a communication media. Communication media may be embodied by computer-readable instructions, data structures, program modules, or other data in a modulated data signal, such as a carrier wave or other transport mechanism, and may include any information delivery media. A "modulated data signal" may be a signal that has one or more of the modulated data signal characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term computer-readable media, as used herein, may include both storage media and communication media.

The computing device 800 may be implemented as a part of a general purpose or specialized server, mainframe, or similar computer, which includes any of the above functions. The computing device 800 may also be implemented as a personal computer including both laptop computer and non-laptop computer configurations.

Example embodiments may also include methods to provide a policy tip for data loss prevention in collaborative environments. These methods may be implemented in any number of ways, including the structures described herein. One such way may be by machine operations, using devices of the type described in the present disclosure. Another optional way may be for one or more of the individual operations of the methods to be performed in conjunction with one or more human operators performing some of the operations while other operations may be performed by machines. These human operators need not be co-located with each other, but each may be with a machine that performs a portion of the program. In other examples, the human interaction may be automated such as by pre-selected criteria that may be machine automated.

FIG. 9 illustrates a logic flow diagram for a process to provide a policy tip for data loss prevention in collaborative environments, according to embodiments. Process 900 may be implemented on a document interactivity application.

Process 900 begins with operation 910 where a document may be displayed to an end user on a display device of a computing device that executes the document interactivity application. At operation 920, an action may be detected from the end user on the display device. The action may affect the document. An example of the action may include a share action to share the document with another end user or a save action to save any changes to the document. Another example of the action may include a trigger, such as the end user editing or having the document open for some amount of time.

The document may be processed based on the action with policies to detect a matched policy at operation 930. The policies may be retrieved from a local resource or from an authorized external resource such as an organizational policy data store. A policy tip associated with the matched policy may be identified at operation 940. The policy tip may be displayed on the display device in association with the document at operation 950.

The operations included in process 900 are for illustration purposes. A document interactivity application according to embodiments may be implemented by similar processes with fewer or additional steps, as well as in different order of operations using the principles described herein.

According to some examples, a computing device to provide a policy tip for data loss prevention in collaborative environments may be described. An example computing device may include a display device, a memory, and a processor coupled to the memory and the display device. The processor may execute a document interactivity application in conjunction with instructions stored in the memory, where the document interactivity application may be configured to display a document to an end user on the display device, detect an action from the end user on the display device, where the action affects the document, process the document based on the action with one or more policies to detect a matched policy from the one or more policies, identify the policy tip associated with the matched policy, and display the policy tip on the display device in association with the document.

In other examples, the document interactivity application may be further configured to detect the action to include a save action that attempts to save the document, identify a subset of the one or more policies that are associated with the save action, and process the document with the subset of the one or more policies to detect the matched policy. The document interactivity application may be further configured to detect private information within the document, and identify the matched policy based on a rule within the matched policy that is triggered in relation to the private information. The document interactivity application may be further configured to display the policy tip, on the display device, to inform the end user of the matched policy in relation to the save action.

In further examples, the document interactivity application may be further configured to detect the action to include a share action that attempts to share the document with one or more other end users, identify a subset of the one or more policies that are associated with the share action, and process the document with the subset of the one or more policies to detect the matched policy. The document interactivity application may be further configured to process an access privilege of the one or more other end users to access the document, and identify the matched policy based on a rule within the matched policy that is triggered in relation to the access privilege of the one or more other end users being insufficient to access the document. The document interactivity application may be further configured to display the policy tip, on the display device, to inform the end user of the matched policy in relation to the share action.

In yet further examples, the document interactivity application may be further configured to detect an override action from the end user to override the matched policy, and identify an override privilege of the end user. In response to detecting the override privilege of the end user as sufficient to override the matched policy, the document interactivity application may be further configured to execute the action on the document. The document interactivity application may be further configured to detect an override action that includes a justification from the end user to override the matched policy, and identify an override privilege of the end user. In response to detecting the override privilege of the end user as sufficient to override the matched policy, the document interactivity application may be further configured to execute the action on the document, and save the justification.

According to some embodiments, a method executed on a computing device to provide a policy tip for data loss prevention in collaborative environments may be provided. An example method may include displaying a document to an end user on a display device of the computing device, detecting an action from the end user on the display device, where the action affects the document, processing the document based on the action with one or more policies to detect a matched policy from the one or more policies, identifying the policy tip associated with the matched policy, and displaying the policy tip on the display device in association with the document to notify the end user of the matched policy.

In other embodiments, an override action from the end user to override the matched policy may be detected, an override privilege of the end user may be identified, in response to detecting the override privilege of the end user as sufficient to override the matched policy, the override action may be transmitted to an administrator of the matched policy to inform the administrator to manage the matched policy, and in response to detecting the override privilege of the end user as insufficient to override the matched policy, the override action may be blocked. A false positive identification from the end user to report the matched policy as a false positive in relation to the document and the action may be detected, the false positive identification may be stored, and the false positive identification may be transmitted to an administrator of the matched policy to inform the administrator to manage the matched policy to prevent a future false positive identification.

In further embodiments, an update to the one or more policies may be received from an authorized policy resource, and the update may be applied to the one or more policies to update the one or more policies. A metadata of the document with the one or more policies may be processed to detect the matched policy. The policy tip may be displayed, on the display device, that includes a portion of the metadata associated with the matched policy.

According to some examples, a computer-readable memory device with instructions stored thereon to provide a policy tip for data loss prevention in collaborative environments may be described. Example instructions may include displaying a document to an end user on a display device of the computing device, detecting an action from the end user on the display device, where the action affects the document, processing the document based on the action with one or more policies to detect a matched policy from the one or more policies, identifying the policy tip associated with the matched policy, and displaying the policy tip on the display device in association with the document to notify the end user of the matched policy.

In other examples, detecting the action may include detecting a save action that attempts to save the document, identifying a subset of the one or more policies that are associated with the save action, processing the document with the subset of the one or more policies to detect the matched policy, detecting private information within the document, and identifying the matched policy based on a rule within the matched policy that is triggered in relation to the private information. Detecting the action may include detecting a share action that attempts to share the document with one or more other end users, identifying a subset of the one or more policies that are associated with the share action, processing the document with the subset of the one or more policies to detect the matched policy, processing an access privilege of the one or more other end users to access the document, and identifying the matched policy based on a rule within the matched policy that is triggered in relation to the access privilege of the one or more other end users being insufficient to access the document.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device to provide a policy tip for data loss prevention in collaborative environments, the computing device comprising:
   a display device;
   a memory;
   a processor coupled to the memory and the display device, the processor executing a document interactivity application in conjunction with instructions stored in the memory, wherein the document interactivity application is configured to:
      display a document to an end user on the display device;
      detect an action from the end user on the display device, therein the action affects the document;
      process the document based on the action with one or more policies to detect a matched policy from the one or more policies;
      identify the policy tip associated with the matched policy;
      display the policy tip on the display device in association with the document;
      detect an override action that includes a justification from the end user to override the matched policy;
      identify an override privilege of the end user;
      in response to detecting the override privilege of the end user as sufficient to override the matched policy, capture the justification from the end user prior to overriding the matched policy, and execute the override action to share the document with one or more other end users; and
      provide an option to the end user to stop display of a future policy tip related to the displayed policy tip or any future policy tip based on a privilege level of the end user.

2. The computing device of claim 1, wherein the document interactivity application is further configured to:
   detect the action to include a save action that attempts to save the document;
   identify a subset of the one or more policies that are associated with the save action; and
   process the document with subset of the one or more policies to detect the matched policy.

3. The computing device of claim 2, wherein the document interactivity application is further configured to:
   detect private information within the document; and
   identify the matched policy based on a rule within the matched policy that is triggered in relation to the private information.

4. The computing device of claim 2, wherein the document interactivity application is further configured to:
   display the policy tip, on the display device, to inform the end user of the matched policy in relation to the save action.

5. The computing device of claim 1, wherein the document interactivity application is further configured to:
   detect the action to include a share action that attempts to share the document with one or more other end users;
   identify a subset of the one or more policies that are associated with the share action; and
   process the document with the subset of the one or more policies to detect the matched policy.

6. The computing device of claim 5, wherein the document interactivity application is further configured to:
   process an access privilege of the one or more other end users to access the document; and
   identify the matched policy based on a rule within the matched policy that is triggered in relation to the access privilege of the one or more other end users being insufficient to access the document.

7. The computing device of claim 5, wherein the document interactivity application is further configured to:
   display the policy tip, on the display device, to inform the end user of the matched policy in relation to the share action.

8. The computing device of claim 1, wherein the document interactivity application is further configured to:
   in response to detecting the override privilege of the end user as sufficient to override the matched policy, execute the action on the document.

9. The computing device of claim 1, wherein the document interactivity application is further configured to:
   in response to detecting the override privilege of the end user as sufficient to override the matched policy, execute the action on the document; and
   save the justification.

10. A method executed on a computing device to provide a policy tip for data loss prevention in collaborative environments, the method comprising:
    displaying a document to an end user on a display device of the computing device;
    detecting an action from the end user on the display device, wherein the action affects the document;
    processing the document based on the action with one or more policies to detect a matched policy from the one or more policies;
    identifying the policy tip associated with the matched policy;
    displaying the policy tip on the display device in association with the document to notify the end user of the matched policy;
    detecting an override action that includes a justification from the end user to override the matched policy;
    identifying an override privilege of the end user;
    in response to detecting the override privilege of the end user as sufficient to override the matched policy, capturing the justification from the end user prior to overriding the matched policy, and executing the override action to share the document with one or more other end users; and
    providing an option to the end user to stop display of a future policy tip related to the displayed policy tip or any future policy tip based on a privilege level of the end user.

11. The method of claim 10, further comprising:
    in response to detecting the override privilege of the end user as sufficient to override the matched policy, executing the action on the document and transmitting the override action to an administrator of the matched policy to inform the administrator to manage the matched policy; and
    in response to detecting the override privilege of the end user as insufficient to override the matched policy, blocking the override action.

12. The method of claim 10, further comprising:
    detecting a false positive identification from the end user to report the matched policy as a false positive in relation to the document and the action;
    storing the false positive identification; and transmitting the false positive identification to an administrator of the matched policy to inform the administrator to manage the matched policy to prevent a future false positive identification.

13. The method of claim 10, further comprising:
receiving an update to the one or more policies from an authorized policy resource; and
applying the update to the one or more policies to update the one or more policies.

14. The method of claim 10, further comprising:
processing a metadata of the document with the one or more policies to detect the matched policy.

15. The method of claim 14, further comprising:
displaying the policy tip, on the display device, that includes a portion of the metadata associated with the matched policy.

16. A computer-readable memory device with instructions stored thereon to provide a policy tip for data loss prevention in collaborative environments the instructions comprising:
displaying a document to an end user on a display device of the computing device;
detecting an action, from the end user on the display device, wherein the action affects the document;
processing the document based on the action with one or more policies to detect a matched policy from the one or more policies;
identifying the policy tip associated with the matched policy;
displaying the policy tip on the display device in association with the document to notify the end user of the matched policy;
detecting an override action that includes a justification from the end user to override the matched policy;
identifying an override privilege of the end user;
in response to detecting the override privilege of the end user as sufficient to override the matched policy, capturing the justification from the end user prior to overriding the matched policy, and executing the override action to share the document with one or more other end users; and
providing an option to the end user to stop display of a future policy tip related to the displayed policy tip or any future policy tip based on a privilege level of the end user.

17. The computer-readable memory device of claim 16, wherein the instructions further comprise:
detecting the action to include a save action that attempts to save the document;
identifying a subset of the one or more policies that are associated with the save action;
processing the document with the subset of the one or more policies to detect the matched policy;
detecting private information within the document; and
identifying the matched policy based on a rule within the matched policy that is triggered in relation to the private information.

18. The computer-readable memory device of claim 16, wherein the instructions further comprise:
detecting the action to include a share action that attempts to share the document with one or more other end users;
identifying a subset of the one or more policies that are associated with the share action;
processing the document with the subset of the one or more policies to detect the matched policy;
processing an access privilege of the one or more other end users to access the document; and
identifying the matched policy based on a rule within the matched policy that is triggered in relation to the access privilege of the one or more other end users being insufficient to access the document.

* * * * *